US012807442B2

(12) United States Patent
Matsumoto

(10) Patent No.: US 12,807,442 B2
(45) Date of Patent: Nov. 24, 2026

(54) SHEET CONVEYING DEVICE AND IMAGE FORMING APPARATUS THEREWITH

(71) Applicant: KYOCERA Document Solutions Inc., Osaka (JP)

(72) Inventor: Hiromu Matsumoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/395,615

(22) Filed: Nov. 20, 2025

(65) Prior Publication Data

US 2026/0153828 A1 Jun. 4, 2026

(30) Foreign Application Priority Data

Dec. 2, 2024 (JP) ................................ 2024-209742

(51) Int. Cl.
*B65H 9/00* (2006.01)

(52) U.S. Cl.
CPC ....... *B65H 9/004* (2013.01); *B65H 2404/722* (2013.01); *B65H 2404/725* (2013.01); *B65H 2511/12* (2013.01); *B65H 2801/06* (2013.01); *G03G 2215/00679* (2013.01)

(58) Field of Classification Search
CPC . B65H 9/004; B65H 9/06; B65H 9/14; B65H 2404/722; B65H 2404/725
See application file for complete search history.

(56) References Cited

U.S. PATENT DOCUMENTS

| | | | | |
|---|---|---|---|---|
| 8,554,124 B2 * | 10/2013 | Lee | B65H 9/06 399/391 |
| 2012/0080838 A1 | 4/2012 | Osada et al. | 271/228 |
| 2013/0161901 A1 | 6/2013 | Uchida et al. | 271/245 |
| 2013/0213771 A1 | 8/2013 | Osada et al. | 198/624 |
| 2015/0191324 A1 | 7/2015 | Fumoto | B65H 9/002 |

FOREIGN PATENT DOCUMENTS

| | | |
|---|---|---|
| JP | 2012-076890 A | 4/2012 |

* cited by examiner

*Primary Examiner* — Jeremy R Severson
(74) *Attorney, Agent, or Firm* — Stein IP, LLC

(57) ABSTRACT

A sheet conveying device includes a pair of conveying rollers and a shutter member. The shutter member has a body portion and a regulating portion protruding radially outward from the outer circumferential edge of the body portion. The regulating portion has a contact surface struck by the leading end of the sheet and a locking portion formed at the boundary between the body portion and the contact surface. N pairs of shutter members, (where n is an integer of two or more) are disposed symmetrically left to right from inward to outward along the sheet width direction, and the m th pair of shutter members (where m is an integer of one or more but n−1 or less) from inward along the sheet width direction has the locking portion formed radially outward compared to the (m+1)th pair of shutter members adjacent outward along the sheet width direction.

4 Claims, 5 Drawing Sheets

SHEET CONVEYING DEVICE AND IMAGE FORMING APPARATUS THEREWITH

INCORPORATION BY REFERENCE

This application is based on and claims the benefit of priority from Japanese Patent Application No. 2024-209742 filed on Dec. 2, 2024, the contents of which are hereby incorporated by reference.

BACKGROUND

The present disclosure relates to a sheet conveying device used in image forming apparatuses, such as copiers, printers, facsimile machines, and multifunction peripherals incorporating all those, that employ an electrophotographic method and also relates to an image forming apparatus provided with such a sheet conveying device. More particularly, the present disclosure relates to a sheet conveying device that conveys a sheet while correcting its skew and also relates to an image forming apparatus provided with such a conveying device.

In a conventional image forming apparatus, the accuracy of the image recording position on the sheet is one of the important factors from the viewpoint of maintaining the quality of image formation. In an image forming apparatus, to improve the accuracy of the image recording position, if the sheet conveyed is skewed, it is necessary to correct the skewed sheet.

According to a conventionally common method, in a sheet conveying passage, a pair of registration rollers is arranged, and the leading end of the sheet conveyed is thrust against a nip portion of the pair of registration rollers in a suspended state to correct the skew of the sheet.

Today, image forming apparatuses are required to be capable of printing on a variety of printing media. In particular, from the perspective of further resource conservation, there has been a growing demand for printing on sheets (thin paper) with lower basis weights than before.

However, the conventional correcting method using a pair of registration rollers can sometimes cause local creases at the leading end of a sheet with a low basis weight and hence with low stiffness. This makes it difficult to sufficiently correct a skew.

SUMMARY

According to one aspect of the present disclosure, a sheet conveying device includes a pair of conveying rollers and a shutter member. The pair of conveying rollers has a driving roller and a driven roller in contact with the driving roller with a predetermined pressure to form a nip portion. The pair of conveying rollers conveys a sheet. The shutter member has a body portion that is rotatably supported on a rotation shaft of the driving rollers and that is formed with a radius substantially equal to that of the driving roller and a regulation portion that protrudes radially outward from the outer circumferential edge of the body portion and that makes contact with the leading end of the sheet moving toward the nip portion upstream of the nip portion along the sheet conveying direction to regulate the leading end of the sheet. The shutter member is switchable between a first position, in which the shutter member can correct a skew of the sheet with the regulation portion, and a second position, which the shutter member reaches by rotating from the first position and in which the shutter member guides the sheet to the nip portion. The regulating portion has a contact surface against which the leading end of the sheet strikes when the shutter member is in the first position and a locking portion that is formed at the boundary between the body portion and the contact surface and that locks the leading end of the sheet. N pairs of shutter members, (where n is an integer of two or more) are provided symmetrically along the left-right direction from inward to outward along the sheet width direction orthogonal to the sheet conveying direction, and the m th pair of shutter members (where m is an integer of one or more but n−1 or less) from inward along the sheet width direction has the locking portion formed radially outward compared to the (m+1)th pair of shutter members adjacent outward along the sheet width direction.

DETAILED DESCRIPTION

Figure 1:
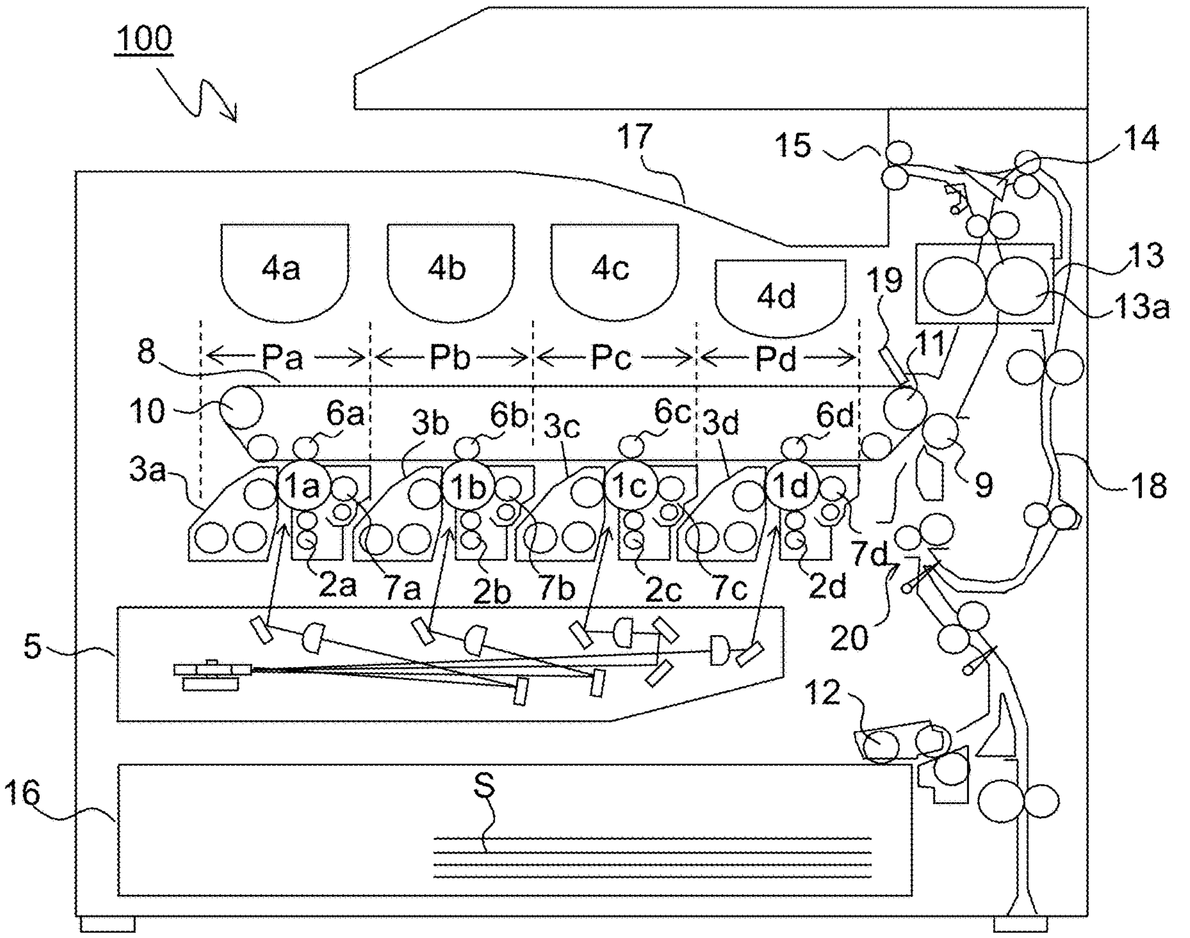
FIG. 1 is a schematic sectional view showing the overall construction of an image forming apparatus incorporating a sheet skew correction unit according to the present disclosure.

An embodiment of the present disclosure will be described below with reference to the accompanying drawings. FIG. 1 is a schematic sectional view showing the construction of an image forming apparatus 100 incorporating a sheet skew correction unit 20 according to the present disclosure. Inside the body of the image forming apparatus 100 (here, a color printer), four image forming portions Pa, Pb, Pc, and Pd are arranged in this order from upstream (left side in FIG. 1) along the conveying direction. These image forming portions Pa to Pd are provided for images of four different colors (cyan, magenta, yellow, and black), and sequentially form a cyan, a magenta, a yellow, and a black images respectively, each through the processes of electrostatic charging, exposure to light, image development, and image transfer.

These image forming portions Pa to Pd include photosensitive drums (image carrying members) 1*a*, 1*b*, 1*c*, and 1*d* respectively, that carry visible images (toner images) of the different colors. On the surfaces of the photosensitive drums 1*a* to 1*d*, an OPC (organic photoconductor) layer is laid as a photosensitive layer. Further, an intermediate transfer belt 8 that rotates counterclockwise in FIG. 1 by the action of a driving motor (not illustrated) is provided adjacent to the image forming portions Pa to Pd.

The toner images formed on these photosensitive drums 1*a* to 1*d* are primarily transferred sequentially to the intermediate transfer belt 8, which moves while in contact with the photosensitive drums 1*a* to 1*d*, and are superimposed on each other. Next, the toner images primarily transferred to the intermediate transfer belt 8 are secondarily transferred to a sheet S as an example of a recording medium by a secondary transfer roller 9. Moreover, the sheet S having the toner images secondarily transferred to it then has the toner image fixed to it in a fixing portion 13 and is then discharged out of the body of the image forming apparatus 100. As the photosensitive drums 1*a* to 1*d* are rotated clockwise in FIG. 1, an image forming process is executed for each of the photosensitive drums 1*a* to 1*d*.

A sheet S to which the toner image is to be secondarily transferred is stored in a sheet cassette 16 disposed in a lower part of the body of the image forming apparatus 100. The sheet S is conveyed to the nip portion between the secondary transfer roller 9 and a driving roller 11 for the intermediate transfer belt 8 via a sheet feed roller 12 and the skew correction unit 20. Used as the intermediate transfer belt 8 is a sheet of a dielectric resin, typically a belt with no seams (seamless belt). Downstream of the secondary transfer roller 9, a blade-form belt cleaner 19 is disposed for removing the toner, and the like remaining on the surface of the intermediate transfer belt 8.

Next, the image forming portions Pa to Pd will be described. Around and below the photosensitive drums 1*a* to 1*d*, which are rotatably arranged, there are provided charging devices 2*a*, 2*b*, 2*c*, and 2*d* that electrostatically charge the photosensitive drums 1*a* to 1*d*, an exposure device 5 that exposes the photosensitive drums 1*a* to 1*d* to light conveying image information, development devices 3*a*, 3*b*, 3*c*, and 3*d* that form toner images on the photosensitive drums 1*a* to 1*d*, and cleaning devices 7*a*, 7*b*, 7*c*, and 7*d* that remove the developer (toner) and the like remaining on the photosensitive drums 1*a* to 1*d*.

When image data is input from a host device such as a personal computer, first, the surfaces of the photosensitive drums 1*a* to 1*d* are electrostatically charged uniformly by the charging devices 2*a* to 2*d*. After that, the exposure device 5 shines light according to the image data onto the photosensitive drums 1*a* to 1*d* to form on them electrostatic latent images corresponding to the image data.

The developing devices 3*a* to 3*d* are loaded with predetermined amounts of two-component developer containing cyan, magenta, yellow, and black toner. When the proportion of toner in the two-component developer in the developing devices 3*a* to 3*d* falls below a prescribed amount as toner images are formed as will be described later, toner is supplied from toner containers 4*a* to 4*d* to the developing devices 3*a* to 3*d*. The toner in the developer is supplied to the photosensitive drums 1*a* to 1*d* by the developing devices 3*a* to 3*d* and attaches to them electrostatically. This forms toner images corresponding to the electrostatic latent images formed by exposure to light from the exposure device 5.

Then, primary transfer rollers 6*a* to 6*d* produce electric fields with a predetermined voltage between themselves and the photosensitive drums 1*a* to 1*d*, and the cyan, magenta, yellow, and black toner images on the photosensitive drums 1*a* to 1*d* are primarily transferred to the intermediate transfer belt 8. These four-color images are formed in a predetermined positional relationship previously determined to form a predetermined full-color image. After that, in preparation for the subsequent formation of new electrostatic latent images, the toner and the like remaining on the surfaces of the photosensitive drums 1*a* to 1*d* after primary transfer are removed by the cleaning devices 7*a* to 7*d*.

The intermediate transfer belt 8 is stretched across a driven roller 10 at the upstream side and the driving roller 11 at the downstream side. When the intermediate transfer belt 8 starts to rotate counterclockwise as a driving motor (not illustrated) rotates the driving roller 11, a sheet S is conveyed, with predetermined timing, from the sheet skew correction unit 20 to the nip portion (secondary transfer nip portion) between the driving roller 11 and the secondary transfer roller 9 adjacent to it. When the sheet S passes through the secondary transfer nip portion, the toner image on the intermediate transfer belt 8 is secondary transferred to the sheet S. The sheet S having the toner image secondarily transferred to it is conveyed to the fixing portion 13.

The sheet S conveyed to the fixing portion 13 is heated and pressed by the pair of fixing rollers 13*a* so that the toner image is fixed to the surface of the sheet S to form the predetermined full-color image. The sheet S having the full-color image formed on it has its conveying direction switched by a branch portion 14 which branches into multiple directions. The sheet S is thus discharged to a discharge tray 17 by a pair of discharge rollers 15 as it is (or after being sent to a duplex conveying passage 18 to be printed on both sides).

Figure 2:
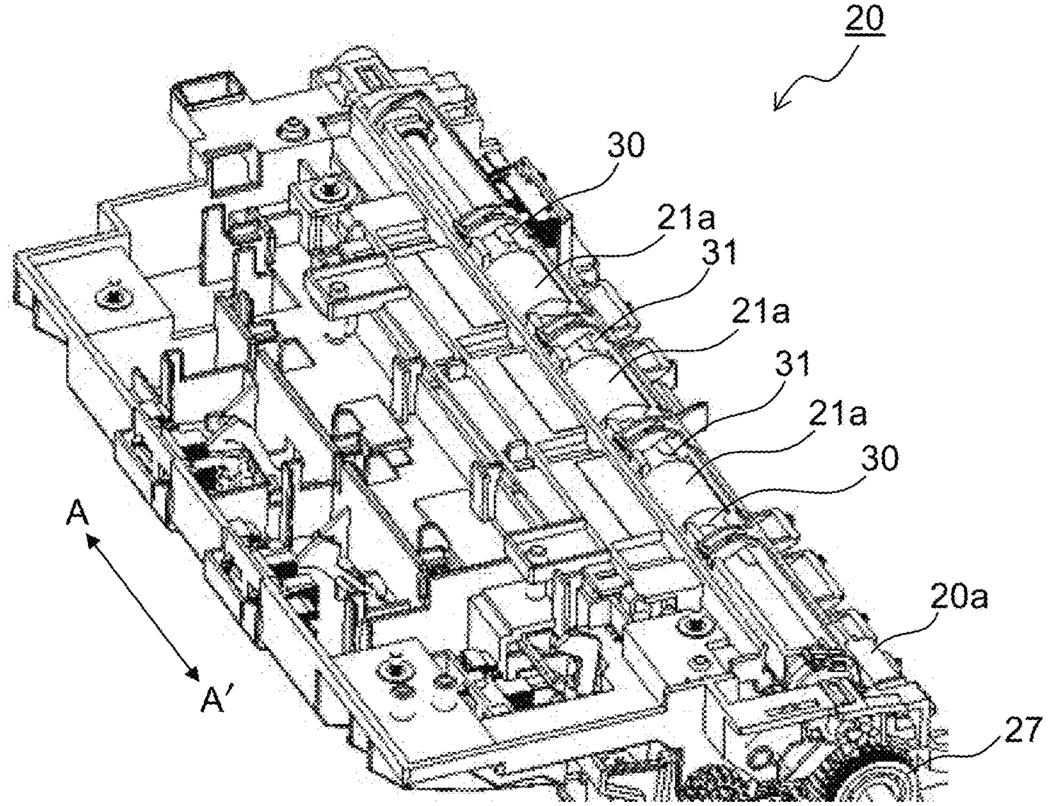
FIG. 2 is a perspective part view, as seen from above, of the sheet skew correction unit according to one embodiment of the present disclosure.

FIG. 2 is a perspective part view, as seen from above, of a sheet skew correction unit 20 according to one embodiment of the present disclosure. The sheet skew correction unit 20 includes a pair of conveying rollers 21 and shutter members 30 and 31. The pair of conveying rollers 21 is composed of a driving roller 21*a* and a driven roller 21*b* (see FIG. 3). A plurality of pairs (in this embodiment, three pairs) of conveying rollers 21 are disposed along the sheet width direction (direction AA' in FIG. 2) orthogonal to the conveying direction of the sheet S.

The driving rollers 21*a* are fixed at three places on a rotation shaft 22 (see FIG. 3) at predetermined intervals. The driven rollers 21*b* are rotatably supported on a rotation shaft 23 (see FIG. 3) at positions facing the driving rollers 21*a* respectively. The rotation shafts 22 and 23 are each supported on a unit housing 20*a* parallel to the sheet width direction. To the rotation shaft 22, a drive input gear 27 is fixed to which a rotational driving force from a driving motor (not illustrated) is input.

Figure 3:
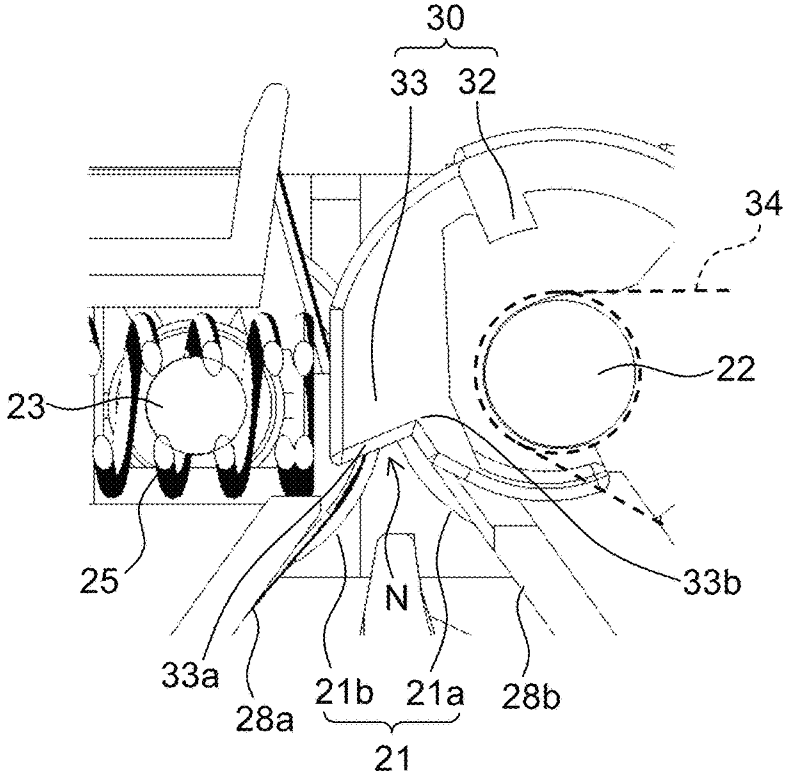
FIG. 3 is a side sectional view showing the construction around a first shutter member in the sheet skew correction unit according to the embodiment.

The rotation shaft 23 is urged in a direction toward the driving rollers 21*a* by a coil spring 25 (see FIG. 3). As a result, the driven roller 21*b* is kept in pressed contact with the driving roller 21*a* with a predetermined pressing force to form a nip portion N (see FIG. 3) and to rotate by following the rotation of the driving roller 21*a*.

The shutter members 30 and 31 are disposed at a total of four places at opposite ends of each pair of conveying rollers 21 along the axial direction. The shutter members 30 and 31 are rotatably supported on the rotation shaft 22 of the driving roller 21*a*. In the following description, for distinction's sake, the pair of shutter members 30 disposed outward of the pairs of conveying rollers 21 are referred to as first shutter members, and the pair of shutter members 31 disposed between the pairs of conveying rollers 21 are referred to as second shutter members.

Of the sheets S conveyed from the sheet cassette 16, a large-size sheet S (e.g., A4 size) strikes both the outer, first, shutter members 30 and the inner, second, shutter members 31 along the sheet width direction. On the other hand, a small-sized sheet S (e.g., A5 size) strikes only the inner, second, shutter members 31.

FIG. 3 is a side sectional view showing the construction around the first shutter member 30 in the sheet skew correction unit 20 according to the embodiment. As shown in FIG. 3, the unit housing 20*a* includes guide portions 28*a* and 28*b* that guide the sheet *S* conveyed from the sheet cassette 16 (see FIG. 1) to the sheet skew correction unit 20 toward the pair of conveying rollers 21.

The first shutter member 30 includes a body portion 32 in the form of disk with a diameter substantially equal to that of the driving rollers 21*a*, and a regulating portion 33 protruding radially outward from the outer circumferential edge of the body portion 32. The regulating portion 33 has a contact surface 33*a* against which the leading end of the sheet S, guided along the guide portions 28*a* and 28*b*, strikes. At the boundary (base end portion of the regulating portion 33) between the body portion 32 and the regulating portion 33, a locking portion 33*b* which locks the leading end of the sheet S is formed.

When no sheet S is passing through the sheet skew correction unit 20, as shown in FIG. 3, the first shutter member 30 is held in a position (first position) in which the contact surface 33*a* is located upstream of (in FIG. 3, below) the nip portion N with respect to the sheet conveying direction (bottom-to-top direction in FIG. 3).

Figure 8:
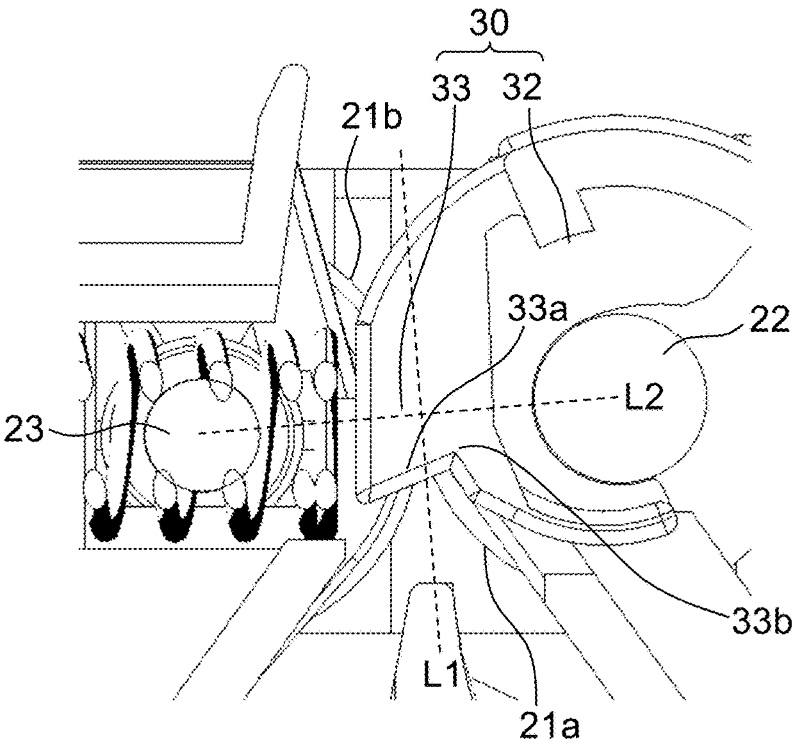
FIG. 8 is a side sectional view showing the relationship between the locking portion of the first shutter member and the nip tangent line through the pair of conveying rollers.

When the first shutter member 30 is in the first position shown in FIG. 3, the contact surface 33*a* is inclined so as to form an acute angle (less than 90 degrees) with the nip tangent line L1 (see FIG. 8). More specifically, the contact surface 33*a* is formed so as to form an acute angle with the nip tangent line L1 after the leading end of the sheet S strikes the contact surface 33*a* of the first shutter member 30 until it reaches the nip portion N of the pair of conveying rollers 21.

In other words, the contact surface 33*a*, is inclined in such a direction that, after the conveyed sheet S strikes the contact surface 33*a* until it reaches the nip portion N, the leading end of the sheet S moves toward the locking portion 33*b* (body portion 32) along the contact surface 33*a*.

The locking portion 33*b* locks the leading end of the sheet S that has struck the contact surface 33*a* and thereby regulates the sheet S so that the leading end of the sheet S lies on a straight line over its entire range along the sheet width direction, which is orthogonal to the conveying direction of the sheet S. Specifically, after the leading end of the sheet S makes contact with the regulating portion 33 until the first shutter member 30 rotates up to the nip portion N, the locking portion 33*b* regulates the sheet S so that the leading end of the sheet S lies on a straight line along the sheet width direction.

The first shutter member 30 is urged by a torsion spring 34 provided on the rotation shaft 22 in such a direction that the contact surface 33*a* moves upstream along the sheet conveying direction (counterclockwise in FIG. 3). While the structure of the first shutter member 30 has so far been described, the second shutter member 31 has a similar structure.

The first and second shutter members 30 and 31 make contact with the leading end of the sheet S upstream of the nip portion N of the pair of conveying rollers 21 with respect to the sheet conveying direction to lock the sheet S, and then rotate to guide the sheet S to the nip portion N. In other words, the first and second shutter members 30 and 31, before the sheet S is nipped in the nip portion N of the pair of conveying rollers 21, make contact with the sheet S to lock it, and then rotate to guide the sheet S to the nip portion N.

Next, skew correction for the sheet S in the sheet skew correction unit 20 will be described with reference to FIGS. 4 to 7 in addition to FIG. 3. FIGS. 4 to 7 are side sectional views showing the action observed when the sheet S passes across the first shutter member 30. The action observed when the sheet S passes across the second shutter member 31 is similar to that shown in FIGS. 4 to 7. The sheet S conveyed from the sheet cassette 16 to the sheet skew correction unit 20 is conveyed, while being guided by the guide portions 28*a* and 28*b*, to the nip portion N of the pair of conveying rollers 21.

Figure 4:
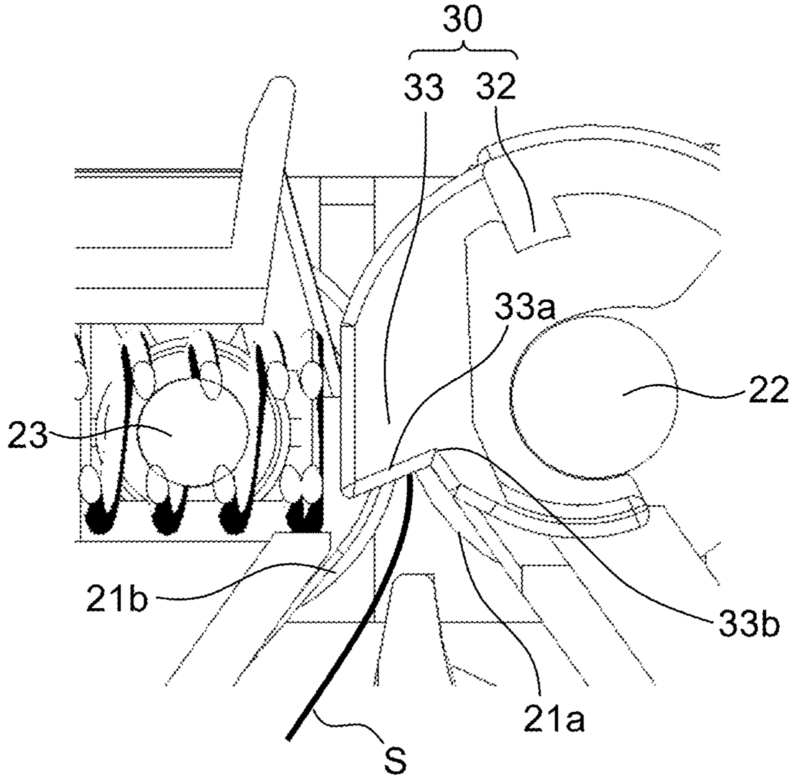
FIG. 4 is a side sectional view showing the action observed when a sheet passes across the first shutter member, showing a state where the leading end of the sheet is in contact with a contact surface of the first shutter member.

FIG. 4 is a diagram showing a state where the leading end of the sheet S is in contact with the contact surface 33*a* of the first shutter member 30. As the sheet S is further conveyed, as shown in FIG. 4, the leading end of the sheet S makes contact with the contact surface 33*a* formed on the regulating portion 33 of the first shutter member 30 in its first position. As described above, the contact surface 33*a* is formed so as to form an acute angle with the nip tangent line L1. Accordingly, when the leading end of the sheet S strikes the contact surface 33*a*, the leading end of the sheet S moves toward the locking portion 33*b* along the contact surface 33*a*.

Figure 5:
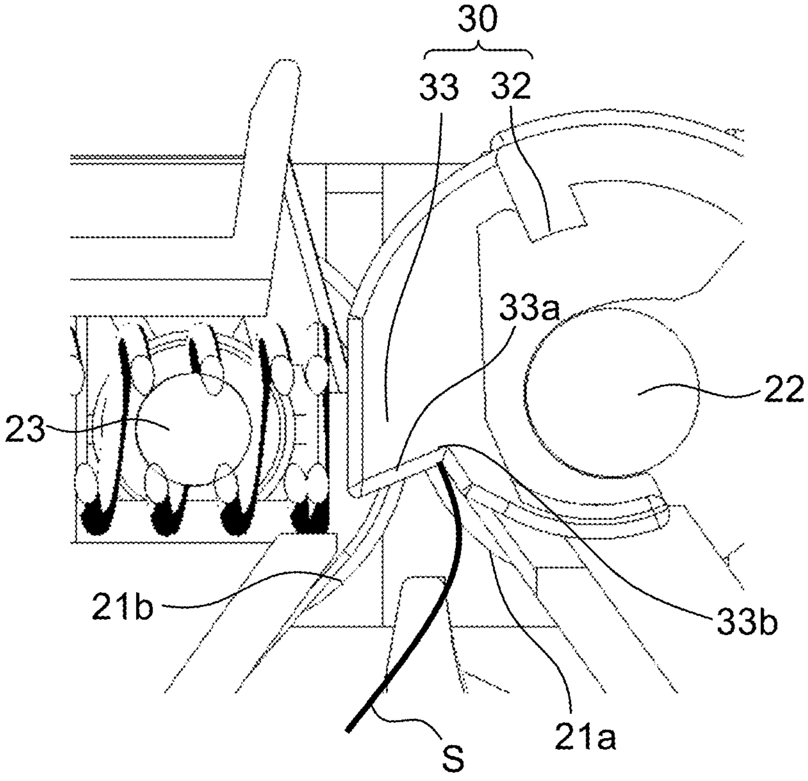
FIG. 5 is a diagram showing a state where the sheet has been conveyed over a predetermined distance from the state in FIG. 4 and the leading end of the sheet is pressing against a locking portion of the first shutter member.

FIG. 5 is a diagram showing a state where the sheet S has been conveyed over a predetermined distance from the state in FIG. 4 and the leading end of the sheet S has moved to the locking portion 33*b* of the first shutter member 30. The leading end of the sheet S is locked by the locking portion 33*b* while pressing the first shutter member 30 in the sheet conveying direction (clockwise in FIG. 4). The first shutter member 30 is urged by the torsion spring 34 (see FIG. 3) in such a direction as to maintain the first position (counter-clockwise in FIG. 4). Accordingly, the first shutter member 30 does not rotate. As the sheet S is conveyed further in the conveying direction, a sag develops in the sheet S under a reaction force from the first shutter member 30.

When a sheet S is skewed, the leading corner of the sheet S (the corner at one side of the sheet S along the width direction that leads due to the skew) makes contact with the contact surface 33*a* of the first shutter member 30 at one side out of the pair of first shutter members 30. When the leading corner of the sheet S is locked by the locking portion 33*b* of the first shutter member 30 at one side, the leading end of the sheet S then makes contact with the contact surfaces 33*a* of the second shutter member 31 at one side, then with the second shutter member 31 at the other side, and then with the first shutter member 30 at the other side in this order, and is locked by their respective locking portions 33*b*.

As a result, the entire range of the leading end of the sheet S along the sheet width direction uniformly lies on a straight line so as to press the locking portions 33*b* of the pair of first shutter members 30 and the pair of second shutter members 31. That is, the leading end of the sheet S becomes parallel to the rotation shaft 22 and in this way the skew of the sheet S is corrected.

As the sheet S is conveyed further from the state in FIG. 5, the stiffness of the sheet S increases the force with which the leading end of the sheet S presses the locking portion 33*b*. When this pressing force exceeds the reaction force received from the first and second shutter members 30 and 31 (i.e., the urging force of torsion spring 34), the first and second shutter members 30 and 31 supported on the rotation shaft 22 rotate against the urging force of the torsion spring 34. At this time, since the leading end of the sheet S is pressing the locking portions 33*b* of the first and second shutter members 30 and 31, the sheet S moves with its leading end kept in contact with the locking portions 33*b*.

Figure 6:
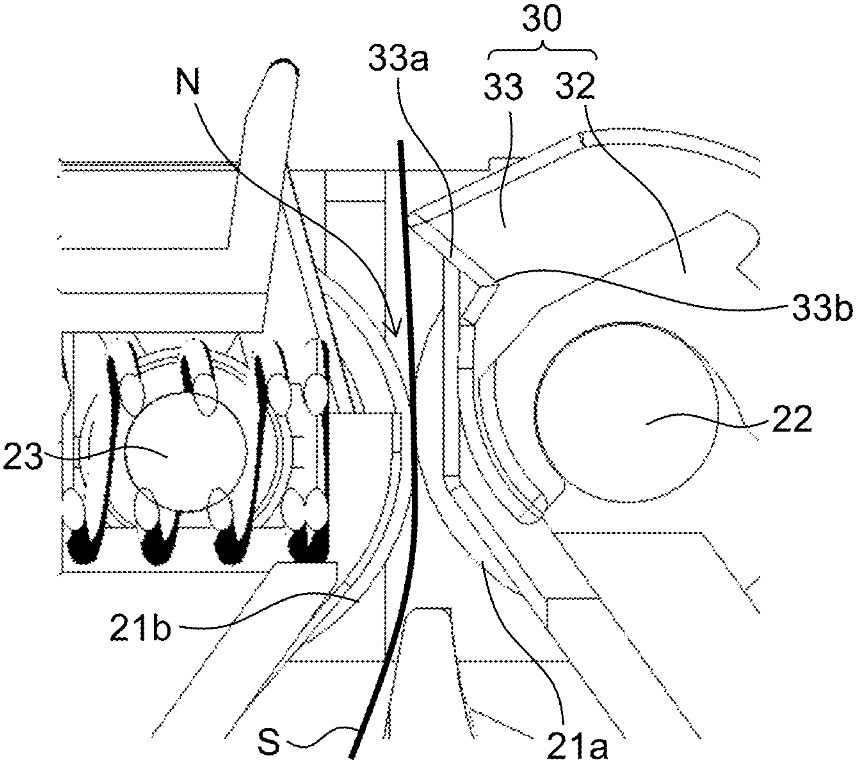
FIG. 6 is a diagram showing a state where the sheet is conveyed over a predetermined distance from the state in FIG. 5 and as the first shutter member rotates, the sheet passes through a nip portion of the pair of conveying rollers.

FIG. 6 is a diagram showing a state where the sheet S is conveyed over a predetermined distance from the state in FIG. 5 and, as the first shutter member 30 rotates, the sheet S passes through the nip portion N of the pair of conveying rollers 21. From the state in FIG. 5, when the first and second shutter members 30 and 31 rotate and the locking portion 33*b* moves to the side of the nip portion N (a position where the nip portion N and the locking portion 33*b* overlap as seen from the axial direction), the leading end of the sheet S enters the nip portion N and is nipped in the pair of conveying rollers 21. When the sheet S is nipped in the pair of conveying rollers 21, the rotation shaft 22 rotates, and thus the driving rollers 21*a* and the driven rollers 21*b* rotate.

As the driving rollers 21*a* and the driven rollers 21*b* rotate, the sheet S is conveyed while being nipped in the nip portion N and the leading end of the conveyed sheet S presses the locking portion 33*b*, this makes the first and second shutter members 30 and 31 rotate further. As shown in FIG. 6, when the locking portions 33*b* of the first and second shutter members 30 and 31 rotate up to a position (second position) where they do not overlap with the nip tangent line L1, the sheet S is unlocked from the locking portion 33*b*. As a result, the sheet S is conveyed toward the nip portion (secondary transfer nip portion) between the intermediate transfer belt 8 and the secondary transfer rollers 9.

Figure 7:
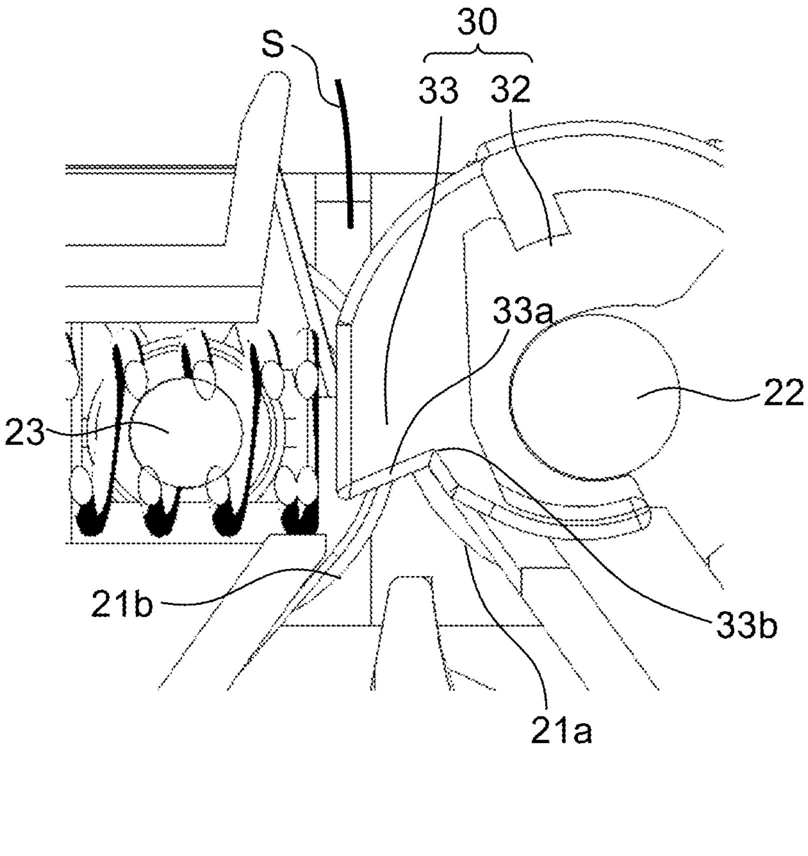
FIG. 7 is a diagram showing a state where the sheet has been conveyed over a predetermined distance from the state in FIG. 6, immediately after the trailing end of the sheet has passed through the nip portion of the conveying roller.

FIG. 7 is a diagram showing a state where the sheet S has been conveyed over a predetermined distance from the state in FIG. 6, immediately after the trailing end of the sheet S has passed through the nip portion N of the conveying roller 21. After the trailing end of the sheet S passes through the nip portion N of the pair of conveying rollers 21, the first and second shutter members 30 and 31 return to the first position under the urging force of the torsion spring 34.

Figure 9:
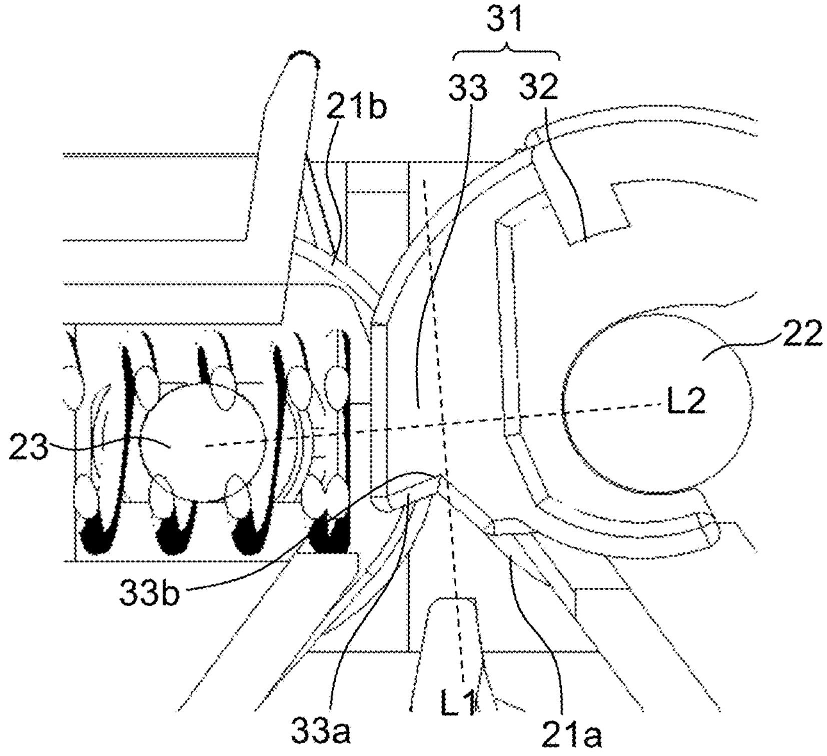
FIG. 9 is a side sectional view showing the relationship between a locking portion of a second shutter member and the nip tangent line through the pair of conveying rollers.

Next, a description will be given of the differences between the first and second shutter members 30 and 31, as the characteristic features of the embodiment. FIG. 8 and FIG. 9 are side sectional views showing the relationship between the locking portions 33*b* of the first and second shutter members 30 and 31 and the nip tangent line L1 through the pair of conveying rollers 21. The nip tangent line L1 is a straight line that passes through the nip portion N of the pair of conveying rollers 21 and that is orthogonal to a straight line L2 passing through the rotational centers of the driving rollers 21*a* and the driven rollers 21*b*.

As shown in FIG. 8, the locking portion 33*b* of the first shutter member 30 is provided closer to the rotational center of the first shutter member 30 than (in FIG. 8, to the right of) the nip tangent line L1. On the other hand, as shown in FIG. 9, the locking portion 33*b* of the second shutter member 31 is provided farther from the rotational center of the second shutter member 31 than (in FIG. 9, to the left of) the nip tangent line L1.

In other words, the locking portion 33*b* of the second shutter member 31 is provided radially outward of the locking portion 33*b* of the first shutter member 30. Accordingly, the force (rotational moment) required for the sheet S to rotate the second shutter member 31 is smaller than the force (rotational moment) required for it to rotate the first shutter member 30.

This makes it easier for the leading end of a small-sized sheet S, which is less stiff than a large-sized sheet, to rotate the second shutter member 31. Accordingly, the small-sized sheet S can pass through the nip portion N more easily and this prevents it from being creased or scratched.

On the other hand, if the second shutter member 31 rotates easily with a small rotational moment, the performance of skew correction for the sheet S may degrade. However, the smaller stiffness of the small-sized sheet S requires it to sag more to press the second shutter member 31, and this makes skew correction easier compared to the large-sized sheet S.

Thus, the construction of the embodiment provides the effect of expanding the range in which two conflicting requirements are met: prevention of sheet creasing/scratching and performance of skew correction. This helps widen, compared to what is conventionally typical, the design range (operation window) for the sheet skew correction unit 20 that corrects a skew using the first and second shutter members 30 and 31.

Moreover, the locking portion 33*b* of the first shutter member 30 is formed radially inward of the nip tangent line L1, while the locking portion 33*b* of the second shutter member 31 is formed radially outward of the nip tangent line. This helps secure a large radial distance between the locking portions 33*b* of the first and second shutter members 30 and 31. It is thus possible to more effectively prevent creasing and scratching of small-sized sheets S, and to further widen the design range for the sheet skew correction unit 20.

In the embodiment, the locking portion 33*b* of the first shutter member 30 is formed radially inward of the nip tangent line L1, and the locking portion 33*b* of the second shutter member 31 is formed radially outward of the nip tangent line L1. This, however, is not meant as any limitation.

That is, the only requirement is that the locking portion 33*b* of the second shutter member 31 be formed radially outward of the locking portion 33*b* of the first shutter member 30. The locking portions 33*b* of the first and second shutter members 30 and 31 may both be formed radially inward of the nip tangent line L1 or the locking portions 33*b* of the first and second shutter members 30 and 31 may both be formed radially outward of the nip tangent line L1.

The embodiment described above is not meant to limit the scope of the present disclosure, which thus allows for any modifications without departure from the spirit of what is disclosed herein. For example, while the above embodiment, deals with the sheet skew correction unit 20 that includes the pair of first shutter members 30 provided outward of the pairs of conveying rollers 21, and the pair of second shutter members 31 provided between the pairs of conveying rollers 21, this is not meant as any limitation.

For example, a construction is also possible that includes n pairs of shutter members (where n is an integer of two or more) disposed symmetrically along the left-right direction from inward to outward along the sheet width direction wherein the m th pair of shutter members (where m is an integer of one or more but n−1 or less) from inward along the sheet width direction has the locking portion 33*b* formed radially outward compared to the (m+1)th pair of shutter members adjacent outward along the sheet width direction.

With such a design, even with a construction that includes three or more pairs of shutter members, it is possible to make the force (rotational moment) required to rotate the shutter member with which the sheet S makes contact increasingly small from outward to inward along the sheet width direction. It is thus possible, regardless of the size of the sheet S, to achieve both satisfactory performance of skew correction for the sheet S and the prevention of creasing and scratching of the sheet S.

While the above embodiment deals with a color printer as shown in FIG. 1 as an example of an image forming apparatus 100, the present disclosure is applicable not only to color printers but to various image forming apparatuses provided with a sheet skew correction unit 20 that uses a shutter member to correct a sheet skew, such as color copiers, color multifunction peripherals, monochrome printers, monochrome copiers, and monochrome multifunction devices.

The present disclosure is applicable to a sheet conveying device that conveys a sheet while correcting a sheet skew using a shutter member, and to an image forming apparatus incorporating such a sheet conveying device. According to the present disclosure, it is possible to provide a sheet conveying device that, while retaining the performance of skew correction of a skew correction mechanism using a shutter member, allows enhanced design flexibility, and to provide an image forming apparatus provided with such a sheet conveying device.

What is claimed is:

1. A sheet conveying device comprising:

a pair of conveying rollers having:

a driving roller; and a driven roller in contact with the driving roller with a predetermined pressure to form a nip portion, the pair of conveying rollers conveying a sheet; and a shutter member having:

a body portion rotatably supported on a rotation shaft of the driving roller, the body portion being formed with a radius substantially equal to a radius of the driving roller; and a regulating portion protruding radially outward from an outer circumferential edge of the body portion, the regulating portion making contact with a leading end of the sheet moving toward the nip portion upstream of the nip portion along a sheet conveying direction to regulate the leading end of the sheet, wherein the shutter member is switchable between a first position, in which the shutter member can correct a skew of the sheet with the regulation portion, and a second position, which the shutter member reaches by rotating from the first position and in which the shutter member guides the sheet to the nip portion, the regulating portion has:

a contact surface against which the leading end of the sheet strikes when the shutter member is in the first position; and a locking portion that is formed at a boundary between the body portion and the contact surface and that locks the leading end of the sheet, and n pairs of the shutter members, (where n is an integer of two or more) are disposed symmetrically along a left-right direction from inward to outward along a sheet width direction orthogonal to the sheet conveying direction, an m th pair of shutter members (where m is an integer of one or more but n−1 or less) from inward along the sheet width direction having the locking portion formed radially outward compared to an (m+1) th pair of shutter members adjacent outward along the sheet width direction.

2. The sheet conveying device according to claim 1, wherein the shutter members include:

a pair of first shutter members that makes contact only with the sheet whose size along the sheet width direction exceeds a predetermined size; and a pair of second shutter members provided inward of the first shutter members along the sheet width direction, the pair of second shutter members making contact with the sheet whose size along the sheet width direction is a predetermined size or smaller, and the second shutter member has the locking portion provided radially outward compared to the first shutter member.

3. The sheet conveying device according to claim 2, wherein when a straight line that passes through the nip portion and that is orthogonal to a straight line passing through rotational centers of the driving and driven rollers is taken as a nip tangent line, the first shutter members have the locking portion provided radially inward of the nip tangent line, and the second shutter members have the locking portion provided radially outward of the nip tangent line.

4. An image forming apparatus comprising the sheet conveying device according to claim 1.

* * * * *